United States Patent
Ng et al.

(10) Patent No.: US 7,727,304 B2
(45) Date of Patent: Jun. 1, 2010

(54) SMELTING PROCESS FOR THE PRODUCTION OF IRON

(75) Inventors: Colette Maria Ng, Mentone (AU); Brian Ross Baldock, Skye (AU); Giuseppe Sofra, East Melbourne (AU); Stephen Peter Hughes, Black Rock (AU); Robert Walter Mautsewicz, Oakleigh (AU); Ross Alexander McClelland, Berwick (AU); David Matthew Sherrington, Mt Martha (AU)

(73) Assignee: Ausmelt Limited, Dandenong, Victoria (AU)

( * ) Notice: Subject to any disclaimer, the term of this patent is extended or adjusted under 35 U.S.C. 154(b) by 751 days.

(21) Appl. No.: 10/542,721

(22) PCT Filed: Jan. 20, 2004

(86) PCT No.: PCT/AU2004/000068
§ 371 (c)(1),
(2), (4) Date: Sep. 26, 2005

(87) PCT Pub. No.: WO2004/065641
PCT Pub. Date: Aug. 5, 2004

(65) Prior Publication Data
US 2006/0037436 A1    Feb. 23, 2006

(30) Foreign Application Priority Data
Jan. 24, 2003    (AU) .............................. 2003900357

(51) Int. Cl.
*C21C 5/00* (2006.01)
(52) U.S. Cl. ...................................................... 75/532
(58) Field of Classification Search .................. 75/331, 75/338, 339, 10.1, 10.35, 10.39, 10.4, 10.41, 75/10.46, 10.59, 10.62, 10.63, 10.65, 10.66, 75/392, 414, 433, 500–507, 528–532, 538, 75/540, 544, 547, 548, 551–561, 148
See application file for complete search history.

(56) References Cited

U.S. PATENT DOCUMENTS 4,968,661 A * 11/1990 Teller et al. .................. 502/304

(Continued)

FOREIGN PATENT DOCUMENTS

AU    647669 B2    3/1994

(Continued)

OTHER PUBLICATIONS

English Language Abstract for JP 63-038506.

(Continued)

*Primary Examiner*—Scott Kastler
*Assistant Examiner*—Vanessa Velasquez
(74) *Attorney, Agent, or Firm*—Norris McLaughlin & Marcus, PA

(57) ABSTRACT

A process for producing iron metal and slag by smelting iron-containing source material, having iron present as oxide and/or a partially metalized state, in a reactor containing a molten bath comprising or having a slag phase, utilises injection of fuel/reductant and oxygen-containing gas into the slag, by at least one top-submerged lance, to generate heating and reducing conditions in at least one reducing region in the bath. The source material is fed to the reactor, together with additional reductant and with flux, at or adjacent to the at least one reducing region, to subject the source material to smelting reduction which generates combustion gases comprising CO and $H_2$. The rates of injection of the oxygen-containing gas and fuel/reductant by said at least one lance are controlled to achieve required, sufficient reducing conditions; and, in the reactor above the bath, the combustion gases generated by the smelting are post-combusted. The controlling of step (c) is conducted to result in the injected oxygen-containing gas having an oxygen content of from about 40 volume % to about 100 volume % and sufficient for a degree of combustion in excess of 60 wt % of the fuel/reductant injected by the at least one lance.

21 Claims, 1 Drawing Sheet

U.S. PATENT DOCUMENTS

Figure 1:
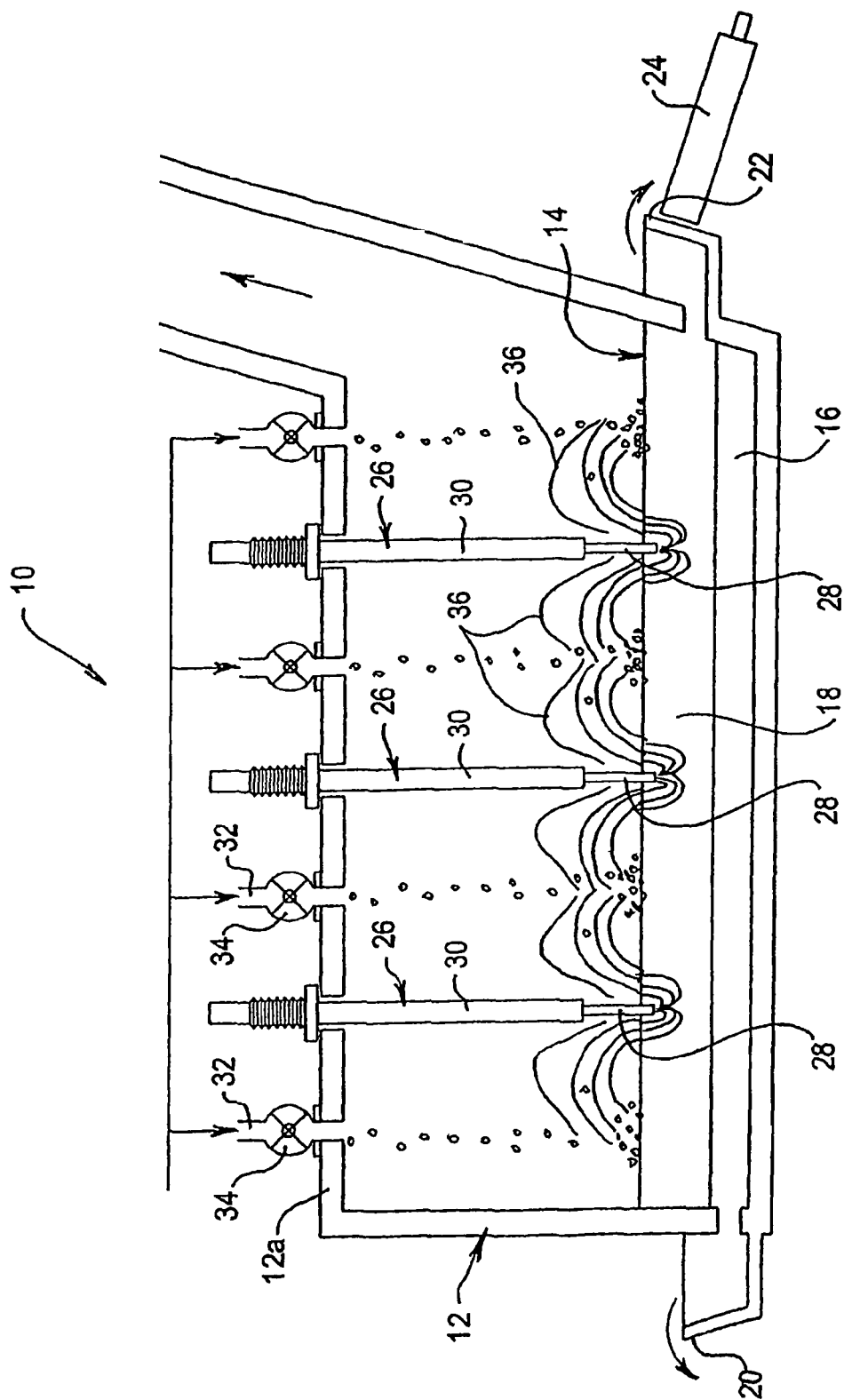

| | | |
|---|---|---|
| 5,251,879 A | 10/1993 | Floyd et al. |
| 5,498,277 A | 3/1996 | Floyd et al. |

FOREIGN PATENT DOCUMENTS

| | | |
|---|---|---|
| AU | 656228 B2 | 1/1995 |
| EP | 1067201 A2 | 1/2001 |
| JP | 62188712 | 8/1987 |
| JP | 63038506 | 2/1988 |
| JP | 01195211 | 8/1989 |
| JP | 01205013 | 8/1989 |
| JP | 07502566 | 3/1995 |
| WO | WO 01/64960 A1 | 9/2001 |
| WO | WO 02/24963 A1 | 3/2002 |

OTHER PUBLICATIONS

English Language Abstract for JP 01-195211.
English Language Translation for JP 1205013.
English Language Abstract for JP 62-188712.

* cited by examiner

SMELTING PROCESS FOR THE PRODUCTION OF IRON

This invention relates to a smelting process for the production of iron from a suitable iron source material.

Our Australian patent specification AU-B-25725/92 (656228) and corresponding U.S. Pat. No. 5,498,277 to Floyd et al disclose a process for smelting iron-containing material in a top-submerged lancing reactor containing a slag bath. In this, heating and reducing conditions are generated in at least one reducing region of the bath by the injection of a carbonaceous fuel/reductant and oxygen-containing gas by at least one top-submerged lance. The iron-containing material(s), additional carbonaceous reductant and fluxes are fed to the reactor, at or adjacent to the reducing region so as to be subjected to smelting and reduction, using coal as the additional reductant. The injected oxygen-containing gas has an oxygen content of from 40 to 100 volume %. Our existing patent discloses that the rates of injection of the oxygen-containing gas and fuel/reductant are controlled to provide a degree of combustion of the fuel/reductant of from 40 wt % to 50 wt %. The gaseous products from the combustion, smelting and reduction reactions may contain substantial quantities of reducing components including, carbon monoxide and hydrogen, as well as dusts containing elemental carbon. These gases and dusts which are carried out of the bath, are subjected to post-combustion by the addition of a secondary oxygen-containing gas stream within the reactor so as to generate heat energy which energy is at least in part transferred to the bath.

Fundamental thermodynamic considerations and industrial practice indicate the production of metallic iron from iron oxides requires very low oxygen potentials of less than about $10^{-8}$ atmospheres at typical iron making temperatures above 1400° C. For the iron to be sufficiently molten at these operating temperatures, the reducing conditions must be adequate to allow the molten iron to retain typically 3 to 4 wt % carbon. Under such reducing conditions, it is expected that carbon dioxide and water vapour generated in the bath would act as oxidants preventing or inhibiting, at least in part, the formation of metallic iron as well as oxidising the contained carbon. Hence, in the process of patent specification AU-B-25725/92 (626228), combustion stoichiometries of the fuel/reductant and oxygen-containing gas delivered by the lance are specified to an upper limit of 50 wt %, at which level only a small quantity, if any, of the oxidising species such as carbon dioxide and water vapour, are generated in the bath by combustion of the fuel/reductant.

The bulk of heat energy generated in the combustion of carbonaceous fuels results from the combustion of carbon monoxide to carbon dioxide and hydrogen to water vapour. In order to recover this energy, the process of specification AU-B-25725/92 (656228) relies almost solely on post-combustion for recovery of the energy value of the fuel.

For post-combustion, further oxygen-containing gas is separately injected into the gas space of the reactor, in order to combust the generated carbon monoxide and hydrogen, and entrained dust containing carbon, just above the bath. Energy is recovered to the bath from this combustion by mechanisms including convection and radiation from the gas space, and direct conduction to new feed and slag splash droplets passing through the gas space. The process of recovering this energy from post-combustion essentially results in little exposure of the metallic iron phase to the oxidised gases. However, while the recovery of energy to the bath is substantial and of considerable practical benefit, the energy recovery is significantly less than 100% efficient, which inefficiency results in the heating of reactor off-gases relative to the bath temperature.

The present invention is directed to providing an improved process for smelting an iron source material, using a top-submerged lancing reactor containing a slag bath and having at least one top-submerged lance, which invention enables improved heat energy utilization.

In the process of the present invention, primary oxygen-containing gas and carbonaceous fuel/reductant are injected in the slag by the at least one lance at rates providing a degree of combustion of the fuel/reductant which is significantly in excess of 50 wt %. That is, the oxygen to fuel/reductant stoichiometry is in excess of 50%.

Thus, according to the present invention, there is provided a process for smelting a suitable iron-containing source material, in which iron is present as oxide and/or in a partially metallised state, wherein at least one combustion region is generated within a slag phase of a molten bath by submerged injection of fuel/reductant and oxygen-containing gas through at least one top-submerged lance; wherein the rates of injection of the oxygen-containing gas and fuel/reductant are controlled to provide a degree of combustion of the fuel/reductant which is in excess of 60 wt %; and wherein gaseous products from combustion, smelting and reduction reactions, and elemental carbon in dusts entrained in the gaseous products, are subjected to post-combustion above the slag phase for transfer of resultant heat energy to the bath.

In the process of the present invention, an iron source material, additional reductant and flux material are fed to the reactor, adjacent to or at a suitable distance from a combustion region generated by the injection of the primary oxygen-containing gas and fuel/reductant.

More specifically, the invention provides a process for producing iron metal and slag by smelting iron-containing source material, having iron present as oxide, in a partially metallised state or a combination thereof, in a reactor containing a molten bath comprising or having a slag phase, wherein the process comprises the steps of:

(a) injecting fuel/reductant and oxygen-containing gas into the slag, by at least one top-submerged lance, to generate heating and reducing conditions in at least one reducing region in the bath;

(b) feeding the source material to the reactor, together with additional reductant and with flux, at or adjacent to the at least one reducing region, whereby the source material is subjected to smelting reduction which generates combustion gases comprising CO and $H_2$;

(c) controlling the rates of injection of the oxygen-containing gas and fuel/reductant by said at least one lance to achieve required, sufficient reducing conditions; and (d) post-combusting, in the reactor above the bath, the combustion gases generated by the smelting;

wherein the controlling of step (c) is conducted to result in the injected oxygen-containing gas having an oxygen content of from about 40 volume % to about 100 volume % and sufficient for a degree of combustion in excess of 60 wt % of the fuel/reductant injected by the at least one lance.

The injected "fuel/reductant" comprises material having a fuel component which is combusted to provide heat energy, and a reductant component which is not combusted and, hence, is available as reductant in smelting reactions. The ratio of fuel to reductant in the fuel/reductant, as will be appreciated, is determined by the rates of injection of oxygen-containing gas and fuel/reductant for a given oxygen-content of the gas. Prior to the commencement of smelting, the lance is fired while in a raised position to generate a combustion flame by fuel being consumed. The lance then is lowered to submerge its lower end in the slag, with the maintained flame providing a combustion region within the slag.

As indicated above, thermodynamic considerations and industrial practice give rise to the expectation that oxygen to fuel/reduction stoichiometries in excess of about 50% would give rise to carbon dioxide and water vapour in the slag bath which would prevent or inhibit the formation of metallic iron, as well as oxidising the carbon and any metallic iron present. However, in the present invention, this expectation is surprisingly shown to be unfounded. This may be due to individual factors associated with the top-submerged injection of oxygen and fuel/reductant in combination with the provision of additional reductant, or to a combination of these factors.

The expectation that, with stoichiometries in excess of about 50%, carbon dioxide and water vapour would prevent or inhibit the formation of metallic iron and oxidise carbon and metallic iron arises from a simple, and conventional consideration of high temperature equilibrium. That is, the system is assumed substantially to be in equilibrium, with essentially the same reduction potential existing throughout the reactor bath. Top-submerged injection results in a high level of turbulence in the slag, which would reasonably justify this assumption. However a first factor possibly enabling the use of stoichiometries in excess of 50% is that, despite such turbulence, the bath is able to sustain regions in which the reduction potential is sufficiently higher than at the combustion region generated by any individual lance. That is, there may be an unexpected departure from the theory of assumed system equilibrium, due to there being a significant difference in reduction potential between respective regions.

An alternative or additional factor may be due to distance between the respective regions. This distance may result from iron source material, additional reductant and flux material being added to the bath at a location spaced from the combustion region generated by any individual lance. Alternatively, the distance may result from the feed of those materials being swept away from the combustion region generated by a lance, as a result of the turbulence generated by the submerged injection. Indeed, even where the iron source material, additional reductant and flux material are added at or closely adjacent to a lance, they can be swept away from the reducing region generated by the lance since the submerged injection usually is at a relatively deep location in the slag bath. Also, in the case of additional reductant, in the form of lump coal, as is preferred, its relatively low density may result in it floating to the surface of the bath, away from the reducing region generated by the lance.

Regardless of the factor or combination of factors involved, the unexpected ability to use stoichiometries in excess of 60% enables improved operating efficiency.

The combustion of the fuel component of the injected fuel/reductant is required to generate the heat energy necessary to heat the reactor contents to a temperature enabling rapid process reactions and to maintain a molten bath. To the extent that combustion is more completely achieved within the bath, the efficiency of direct energy take-up by the bath is significantly increased and it is unexpected that this can be utilised. The overall level of energy taken up by the bath can be still further increased by post-combustion of any remaining uncombusted gas species, including carbon monoxide and hydrogen, generated by the submerged combustion, smelting and reduction reactions, or entrained carbon containing dust. The recovery by the bath of the heat energy generated from post-combustion is still less efficient than the recovery of energy from submerged combustion.

Therefore, the overall recovery of energy from the fuel/reductant, both by direct submerged combustion and by post combustion, is substantially increased by the process of the present invention. Hence, increasing the degree of submerged combustion by increasing the oxygen to fuel stoichiometry beyond the previously accepted limit of 50% enables the iron production intensity to be substantially increased for a given level of fuel consumption or, conversely, the invention provides for a significantly reduced level of fuel consumption for a given intensity of iron production. In each case, there is more efficient iron production in terms of the energy consumption per unit of iron produced.

In the process of the present invention, the stoichiometry of injected oxygen to the fuel component of the injected fuel/reductant preferably is in excess of 65%. The lance combustion stoichiometry may be between 60% and 100%, but more preferably between 65% and 90%. Optimum benefits are found to be achieved at stoichiometries between 65% and 85%.

In general, it is desirable to use a stoichiometry in excess of 60% in order to achieve a significant enhancement of iron production efficiency. However, a desirable stoichiometric range is found to vary with the grade, chemical and physical attributes of the fuel/reductant or any additional carbonaceous materials used in the process. For example, with lower ranking fuels, the range preferably may be from 60% to 75%, while with a higher ranking fuel, such as black coal, the range may be from 70% to a value approaching 100%.

The process of the present invention utilises basic carbothermic reduction of iron oxides to achieve production of metallic iron. The submerged combustion of fuel provides the heat energy necessary to drive the smelting and reduction reactions. While the higher lance combustion stoichiometry correspondingly reduces the level of carbon monoxide and hydrogen produced by direct fuel/reductant combustion, carbon monoxide and hydrogen are also generated by the smelting reactions. Thus, as in the process of patent specification AU-B-25725/92 (656228), the process of the present invention also benefits from post-combustion to maximise heat energy take-up by the bath. That is, the more efficient fuel utilisation obtained by the increased level of lance combustion stoichiometry does not obviate the need for post-combustion in order that overall operating efficiency is maximised.

The post-combustion preferably is conducted to achieve an oxidation degree in excess of 0.2, as determined by the ratio of $(CO_2+H_2O)$ to $(CO+H_2+CO_2+H_2O)$ for the reactor off-gases. The oxidation degree is preferably controlled to about 0.95-1.0. The oxidation degree is controlled so as to achieve a maximum level of heat transfer to the bath, consistent with any subsequent use of the gases, while not re-oxidising the bath. The subsequent use of the gases may include preheating of feed materials or gases, and/or steam generation or other means of recovering energy from the gases.

The top submerged injection in accordance with the present invention provides sufficiently reducing conditions to produce metallic iron while providing optimised energy recovery in the bath. The injected fuel/reductant may comprise at least one of coal in fine particulate form, fuel oil, natural gas, LPG or other suitable carbonaceous material. Particularly in the case of fuel comprising fine coal, the fuel is injected by means of a carrier gas and that gas may comprise at least part of the oxygen required for fuel combustion. The carrier gas alternatively may comprise a mixture of inert gas such as nitrogen with air, oxygen-enriched air or solely oxygen, or it may simply comprise inert gas. Part of the oxygen required for combustion may be injected by flow through the lance which is separated from the flow of fuel/reductant, with mixing of the separate flows occurring only at the lower end of the lance and/or in the slag bath. Where at least part of the oxygen is injected by such separate flow, it may comprise oxygen alone, oxygen enriched air, or such gas mixed with an inert gas such as nitrogen.

The rates of injection of primary oxygen and fuel/reductant are controlled to achieve the required combustion conditions and, as indicated, those conditions are sufficiently reducing. Thus, the primary injected oxygen-containing gas has an oxygen content of typically 40 to 100 volume %, and sufficient for a degree of combustion of the fuel/reductant in excess of 50%, preferably in excess of 60%.

The additional carbonaceous reductant preferably is coal. It is fed to the bath along with the iron source material, most preferably at the rate of about 20 to 60 percent by weight of the source material. Suitable flux material such as at least one of limestone, dolomite, calcined lime, calcined dolomite or silica, depending on the source material, may also be fed with the source material such that a suitably fluid bath is formed. The additional carbonaceous reductant and source material may be fed continuously during a smelting operation, with tapping of slag and iron metal being either continuous or batchwise. Feed may be as independent materials or in an agglomerated form including some or all of the feed components.

A variety of forms of top submerged lances can be used. However, the smelting reduction process of the invention necessitates relatively high reactor temperatures, such as from about 1350° C. to about 1500° C. The top-submerged lance therefore is preferably constructed of suitable steel, for example stainless steel or other suitable materials such as copper, metal oxides, ceramics and combinations or mixtures of these, including coatings.

Cooling of the lance generally is necessary, by supply of a coolant fluid thereto during the smelting operation. To enable this, the lance may for example be of the form disclosed in our International application PCT/AU90/00466 (WO91/05214) filed on 26 Sep. 1990, or of the form disclosed in our Australian patent 647669. The disclosure of each of those references is incorporated herein and to be read as part of the disclosure of the present invention.

The post-combustion required by the process of the present invention is conducted by oxygen, or an oxygen-containing gas such as air or oxygen-enriched air, being blown into the reactor space above the slag bath. The post-combustion preferably is close to the bath surface, and most preferably adjacent to a reducing region, to achieve a high level of heat transfer to the slag bath. In each case, the post-combustion is conducted in a post-combustion zone closely adjacent to the bath surface whereby droplets of slag splashed from the bath by turbulence generated by the injecting into the slag pass through and take up heat energy in the post-combustion zone.

The oxygen-containing gas for post-combustion can be supplied by any suitable means, such as by means of at least one conduit having its discharge end above the bath surface. Alternatively the gas may be blown into the reactor space through a shroud pipe through which the top submerged lance for fuel/reductant injection extends, with the shroud pipe terminating above the bath surface. The shrouded lance of PCT/AU90/00466 and the lance with a shroud pipe disclosed in our co-pending Australian patent 647669 are suitable for this purpose.

The iron source material can be in lumps or in particulate or finely divided form but, particularly in the case of fine material, it preferably is agglomerated, by itself or with the flux material and/or coal, to prevent the source material being blown out with reactor flue gases. Agglomeration can be by use of addition of water at a pugging screw or other suitable device.

The iron source material and other materials such as flux and further reductant most preferably are charged to or adjacent to a combustion region resulting from to submerged injection via suitably positioned charging port. However, some or all of the source material and flux, when of a suitable particle size, may be charged to the reactor through a top submerged lance. In either case, the top submerged injection most preferably is such as to generate substantial turbulence in the combustion region, typically with substantial up-swelling of the bath surface.

The iron source material may comprise or include iron ore, as lump, particulate material or fines. Alternatively, it may comprise or include pellets, pellet particulate material or fines, iron sands, iron residues, scale, steel plant flue dust, ferrous scrap, partially metallised materials and high iron slag.

In order that the invention may be understood more readily, reference is made to the accompanying drawing. The drawing schematically illustrates a top-submerged lancing reactor system 10, in a sectional view taken on a vertical plane extending longitudinally through system 10.

The system 10 includes a reactor 12 containing a molten bath 14 comprising a lower layer 16 of metallic iron and an upper layer 18 of slag. At one end, the reactor 12 has a weir 20 by which iron product is able to discharge continuously. At the other end, reactor 12 has a weir 22 by which slag is able to discharge continuously. From weir 22, slag is able to pass along launder 24 to a slag handling system (not shown), such as a granulator.

While weirs 20, 22 are shown, it is to be understood that an alternative form of tapping facility could be provided.

While other arrangements are possible, system 10 includes a plurality of lance devices 26 which are spaced in a series along the centre-line of reactor 12. The devices 26 extend down through the roof 12a of reactor 12 and they are able to be raised and lowered independently by supporting mechanisms (not shown) located above reactor 12. The devices 26 are of the type disclosed in our International patent application PCT/AU90/00466 (WO91/05214) and corresponding U.S. Pat. No. 5,251,879 to Floyd. Thus, each device 26 comprises a top-submerged lance 28 by which required smelting operations are conducted, and a tubular shroud 30 through which the lance 28 extends. Each lance 28 enables injection of oxygen-containing gas and fuel/reductant (as explained above) within the slag layer due to the lower, discharge end of the lance and a combustion flame at that end being submerged in the slag layer. However, each shroud 30 is shorter than its lance 28. Thus, with the lances 28 lowered to enable that submerged injection, the lower end of each shroud 30 is spaced above the slag layer. Further oxygen-containing gas is able to be discharged into reactor 12, above the bath 14, by flow of that further gas down a passageway defined between each shroud 30 and its lance 28 and out from the lower end of the shroud.

The system 10 further includes a plurality of feed ports 32, each provided with a feed-control device 34. One port 32 is located between the end of reactor 12 at which weir 20 is provided and the lance device 26 nearest to weir 20. A further respective port 32 is located between each pair of successive lance devices 26. Another port 32 is located between the other end of reactor 12, at which weir 22 is provided, and the device 26 nearest to weir 22.

For use of the present invention, at least slag layer 18 is first established. The slag may have been left over from the previous cycle of operation. Alternatively, layer 18 may be established by melting in the reactor a charge of iron-containing source material, comprising or including oxide, and fluxes, preferably with granular slag. For this, at least one of the lances 28 is fired and the flame produced by combustion of fuel is used to heat and melt the charge.

Once at least slag layer 18 is established, smelting according to the invention is able to proceed. In a preferred method, fine coal as fuel/reductant, air and oxygen are injected through each lance 28. With each lance fired and still in a raised position, injection from above is used to generate turbulence in the slag which causes the slag to splash and form a slag coating on the exposed portion of each lance 28 and the lower extent of each shroud 30. The coating is solidified by coolant fluid circulated through each device 26. The devices 26 then are lowered to submerge the lower end of each lance 28 and its flame in the slag, and injection then is continued within the slag. Despite the lower end of each lance being submerged, the circulating coolant is able to maintain the protective slag coating.

Concurrently with the top submerged injection, iron-containing source material, further reductant and fluxes are charged through ports 32. The further reductant preferably is lump coal. Also, oxygen is discharged into the reactor space, above the slag layer, to achieve post-combustion of gases which are produced during smelting and evolve from bath 14.

The rates of injection of oxygen-containing gas and fuel/reductant by the lances are controlled to provide a degree of combustion of the fuel/reductant which is in excess of 60 wt %. That is, the oxygen consumes in excess of 60 wt % of the fuel/reductant as a fuel component. Thus, while the combustion region generated in the slag by each lance generally will be reducing, due to the remaining reductant component of the fuel/reductant, it is less strongly reducing than with the process of the abovementioned specification AU-B-25725/92 (656228). However, sufficiently overall reducing conditions are able to be maintained by the reductant component of the injected fuel/reductant and the further reductant comprising lump coal.

The smelting proceeds by reduction of iron oxide to iron in the slag phase by carbon reduction. The reduction is facilitated by the substoichiometric ratio of injected oxygen to fuel/reductant in the combustion regions. Also, turbulence generated by the injected and rising gases produces a cascade of slag droplets as depicted at 36. The rising gases include CO and $H_2$, as well as entrained carbonaceous dust. The reduction is able to be further facilitated by post-combustion of the evolved gases and dust by oxygen discharged above the slag layer, through the shroud 36 of each lance device 26. The post-combustion generates substantial heat energy of which a significant proportion is taken up by the cascading slag.

While the fuel/reductant preferably is fine coal, other materials such as detailed earlier herein are able to be used. Also, while the further reductant preferably is lump coal, alternative reductants can be used. Suitable fluxes are as detailed earlier herein. Also, the oxygen-content of the injected and post-combustion oxygen-containing gases also may be as detailed earlier herein.

The present invention does not rely on the need to use pre-reduced materials, whether from an independent plant or by use of reactor off-gases from the present invention. Such pre-reduction would offset the better cost-effectiveness or efficiency of operation made possible by the present invention. Rather, it is better to maximise heat energy input to the bath from post-combustion, by conducting post-combustion to an oxidation degree of up to about 0.95 to 1.0.

As indicated earlier herein, the use of rates of injection of oxygen and fuel/reductant to provide a degree of combustion of in excess of 60 wt % of the fuel/reductant enables more efficient iron production in terms of energy consumption per unit of iron product. In part, this results from the higher level of fuel efficiency by submerged combustion within the slag than by post-combustion above the slag. Thus, either higher smelting temperatures and, hence higher smelting reaction rates, are able to be achieved for a given level of fuel and total reductant consumption or a given level of iron production is able to be achieved with a lesser level of fuel and total reductant consumption.

Along the reactor 12, there may be uniform feed through each port and injection through each lance. However, the ratio of iron-containing source material to further reductant may decrease from one port 32 to the next in the direction from the end at which weir 22 is located to the end at which weir 20 is located. Also, while the rate of injected oxygen to fuel/reductant overall is to be such as to provide in excess of 60% combustion of fuel/reductant, the level of combustion may decrease from one lance 28 to the next in that direction such that successive combustion zones become progressively more strongly reducing towards weir 20.

Finally, it is to be understood that various alterations, modifications and/or additions may be introduced into the constructions and arrangements of parts previously described without departing from the spirit or ambit of the invention.

The invention claimed is:

1. A process for producing iron metal and slag by smelting iron-containing source material, having iron present as oxide, in a partially metallised state or a combination thereof, in a reactor containing a molten bath comprising or having a slag phase, wherein the process comprises the steps of:
   (a) injecting fuel/reductant and oxygen-containing gas into the slag, by at least one top-submerged lance, to generate heating and reducing conditions in at least one reducing region in the bath;
   (b) feeding the source material to the reactor, together with additional reductant and with flux, at or adjacent to the at least one reducing region, whereby the source material is subjected to smelting reduction which generates combustion gases comprising CO and $H_2$;
   (c) controlling the rates of injection of the oxygen-containing gas and fuel/reductant by said at least one lance to achieve required, sufficient reducing conditions; and
   (d) post-combusting, in the reactor above the bath, the combustion gases generated by the smelting;
wherein the controlling of step (c) is conducted to result in the injected oxygen-containing gas having an oxygen content of from about 40 volume % to about 100 volume % and sufficient for a degree of combustion in excess of 60 wt % of the fuel/reductant injected by the at least one lance.

2. The process of claim 1, wherein the controlling of step (c) is conducted to provide a degree of combustion in excess of 65 wt % of the fuel/reductant injected by the at least one lance.

3. The process of claim 1, wherein the controlling of step (c) is conducted to provide a degree of combustion of between 65 wt % and 90 wt % of the fuel/reductant injected by the at least one lance.

4. The process of claim 1, wherein the controlling of step (c) is conducted to provide a degree of combustion of between 65 wt % and 85 wt % of the fuel/reductant injected by the at least one lance.

5. The process of claim 1, wherein the fuel/reductant and the additional reductant comprising coal are lower ranking fuel and the controlling of step (c) is conducted to provide a degree of combustion of between 65 wt % to 75 wt % of the fuel/reductant injected by the at least one lance.

6. The process of claim 1, wherein the fuel/reductant and the additional reductant comprising coal are higher ranking fuel and the controlling of step (c) is conducted to provide a degree of combustion of at least 70 wt % of the fuel/reductant injected by the at least one lance.

7. The process of claim 1, wherein the post-combustion of step (d) is conducted to achieve an oxidation degree in excess of 0.2, as determined by the ratio of ($CO_2+H_2O$) to ($CO+H_2+CO_2+H_2O$) for resultant reactor off-gases.

8. The process of claim 7, wherein the oxidation degree is controlled to about 0.95 to 1.0.

9. The process of claim 1, wherein the fuel/reductant comprises at least one carbonaceous reductant selected from particulate coal, fuel oil, natural gas and LPG.

10. The process of claim 1, wherein the fuel/reductant comprises particulate coal injected by means of a carrier gas.

11. The process of claim 10, wherein the carrier gas contains at least part of the oxygen required for combustion of fuel of the fuel/reductant.

12. The process of claim 10, wherein the carrier gas is selected from nitrogen, oxygen, air and oxygen enriched air.

13. The process of claim 1, wherein the additional reductant is coal.

14. The process of claim 1, wherein the additional reductant is coal supplied at a rate of from about 20% to 60% by weight of the source material.

15. The process of claim 1, wherein the flux comprises at least one of limestone, dolomite, calcined lime, calcined dolomite and silica.

16. The process of claim 1, wherein the smelting is conducted at a reactor temperature of from about 1350° C. to about 1500° C.

17. The process of claim 1, wherein the post-combustion is conducted by blowing into a space of the reactor, above the molten bath, an oxygen-containing gas selected from air and oxygen-enriched air.

18. The process of claim 1, wherein the post-combustion is conducted in a post-combustion zone closely adjacent to the bath surface whereby droplets of slag splashed from the bath by turbulence generated by the injecting into the slag pass through and take up heat energy in the post-combustion zone.

19. The process of claim 18, wherein the post-combustion zone is adjacent to the at least one reducing region.

20. The process of claim 1, wherein the iron-containing source material comprises lumps or agglomerated fine material.

21. The process of claim 1, wherein the iron-containing source material is at least one of iron ore lump, iron ore particulate material, pellets, pellet fines, iron sands, iron residues, scale, steel plant flue dust, ferrous scrap, partially metallised materials and high iron slag.

* * * * *